(12) United States Patent
Pesavento et al.

(10) Patent No.: US 11,107,034 B1
(45) Date of Patent: *Aug. 31, 2021

(54) PORTAL MONITORING WITH STEERED-BEAM RFID SYSTEMS

(71) Applicant: Impinj, Inc., Seattle, WA (US)

(72) Inventors: Alberto Pesavento, Seattle, WA (US); Adrian Wojnowski, Costa Mesa, CA (US); Joshua F. Ensworth, Bothell, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,111

(22) Filed: May 11, 2020

Related U.S. Application Data

(63) Continuation of application No. 16/137,555, filed on Sep. 21, 2018, now Pat. No. 10,650,346.

(60) Provisional application No. 62/561,651, filed on Sep. 21, 2017.

(51) Int. Cl.
*G06Q 30/00* (2012.01)
*G06Q 10/08* (2012.01)
*G06K 7/10* (2006.01)

(52) U.S. Cl.
CPC ....... *G06Q 10/087* (2013.01); *G06K 7/10366* (2013.01)

(58) Field of Classification Search
CPC ............. H01Q 1/2216; H01Q 21/0006; H01Q 9/0464; H01Q 21/28; H01Q 25/005; H01Q 3/247; G06K 7/10346; G06K 17/0029; G06K 7/10178; G06K 7/10425; G06Q 10/087; G08B 13/2417; G08B 13/2437; G08B 13/246
See application file for complete search history.

(56) References Cited

U.S. PATENT DOCUMENTS

| | | | |
|---|---|---|---|
| 5,550,364 A * | 8/1996 | Rudeen | G06K 7/10564 235/462.34 |
| 9,349,032 B1 * | 5/2016 | Diorio | G08B 13/2417 |
| 9,818,084 B1 * | 11/2017 | Diorio | G06K 19/07749 |
| 10,430,623 B1 * | 10/2019 | Pesavento | G06K 7/10316 |
| 10,521,768 B1 * | 12/2019 | Diorio | G06Q 10/087 |
| 10,650,346 B1 * | 5/2020 | Pesavento | G06K 7/10366 |
| 2015/0123869 A1 | 5/2015 | Bit-Babik et al. | |
| 2016/0042206 A1 * | 2/2016 | Pesavento | G06K 7/10178 235/385 |
| 2016/0056542 A1 | 2/2016 | Faraone et al. | |
| 2016/0204503 A1 | 7/2016 | Faraone et al. | |
| 2017/0243032 A1 * | 8/2017 | Pesavento | G06K 7/10297 |

* cited by examiner

*Primary Examiner* — Thien M Le
(74) *Attorney, Agent, or Firm* — Hertzberg, Turk & Associates, LLC

(57) ABSTRACT

Portals and other chokepoints can be monitored with RFID reader systems. A portion of an RFID reader system capable of generating multiple beams can be mounted between two adjacent chokepoints such that some beams are associated with one chokepoint while other beams are associated with the other chokepoint. When replies from an item are received, the item can be associated with a chokepoint based on parameters or characteristics associated with the replies and/or the beam(s) on which the replies are received. If the detected item is moving, its movement direction through the chokepoint and/or its movement speed may also be determined.

20 Claims, 7 Drawing Sheets

RFID READER SYSTEM CONFIGURATION WITH OPTIONAL LOCAL AND REMOTE COMPONENTS

PORTAL MONITORING WITH STEERED-BEAM RFID SYSTEMS

CROSS REFERENCE TO RELATED APPLICATIONS

This Application is a continuation under 35 U.S.C. § 120 of U.S. patent application Ser. No. 16/137,555 filed on Sep. 21, 2018, which claims the benefit of U.S. Provisional Patent Application Ser. No. 62/561,651 filed on Sep. 21, 2017. The disclosures of the above application are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves using inventorying commands to singulate a tag, receive an identifier from a tag, and/or acknowledge a received identifier (e.g., by transmitting an acknowledge command). "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventorying signal (an inventorying command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

RFID systems can be used to track the movement of items through a facility. For example, appropriately positioned and configured RFID readers can track the movement and location of items in a warehouse. In general, different facility layouts and configurations may require different RFID system configuration in order to provide adequate tracking capability.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to monitoring portals and other chokepoints with RFID reader systems. A portion of an RFID reader system capable of generating multiple beams can be mounted between two adjacent chokepoint such that some beams are associated with one chokepoint while other beams are associated with the other portal. When replies from an item are received, the item can be associated with a chokepoint based on parameters or characteristics associated with the replies and/or the beam(s) on which the replies are received. If the detected item is moving, its movement direction through the chokepoint and/or its movement speed may also be determined.

According to one example, a method to track the trajectory of an RFID tag is provided. The method may include generating a first plurality of spatially separated reader beams oriented along a first tag trajectory and generating a second plurality of spatially separated reader beams oriented along a second tag trajectory. The method may further include transmitting inventorying commands on the first and second plurality of reader beams and receiving, from the tag, a plurality of replies responding to the inventorying commands. The method may further include determining at least one cumulative reply parameter from the plurality of replies, selecting the first or second tag trajectories as an actual tag trajectory based on the at least one cumulative reply parameter, and determining a tag trajectory direction from the at least one cumulative reply parameter.

According to another example, a method for a synthesized-beam reader to track the trajectory of an RFID tag is provided. The method may include synthesizing a first plurality of spatially separated beams oriented along a first tag trajectory and synthesizing a second plurality of spatially separated beams oriented along a second tag trajectory. The method may further include transmitting inventorying commands on the first and second plurality of beams and receiving, from the tag, a plurality of replies responding to the inventorying commands. The method may further include determining at least one cumulative reply parameter from the plurality of replies, selecting the first or second tag trajectories as an actual tag trajectory based on the at least one cumulative reply parameter, and determining a tag trajectory direction from the at least one cumulative reply parameter.

According to yet another example, a method to track the passage of an RFID tag through one of two neighboring portals is provided. The method includes generating, via a first RFID reader, a first plurality of spatially separated beams oriented near a first one of the portals and a second plurality of spatially separated beams oriented near a second one of the portals. The method further includes transmitting inventorying commands on the first and second plurality of beams and receiving, from the tag, a plurality of replies responding to the inventorying commands. The method further includes determining at least one cumulative reply parameter from the plurality of replies and determining that the tag is passing through the first or second portal in a passage direction.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies as will be known to those skilled in the art, and may be volatile or not. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to a standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

Figure 1:
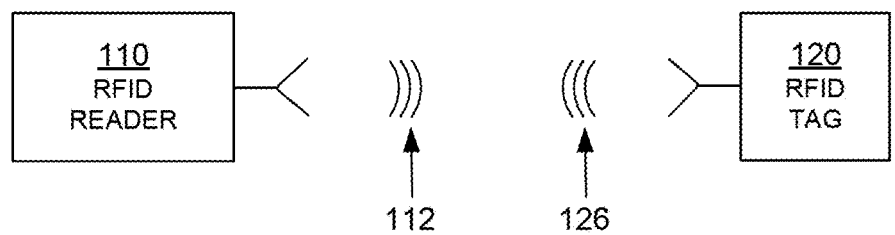
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generates signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
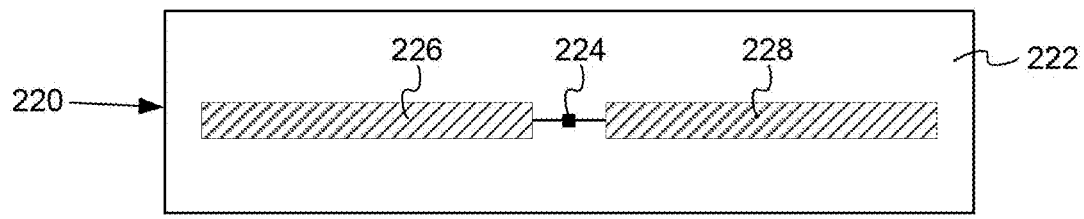
FIG. 2 is a diagram showing components of a passive RFID tag, such as a tag that can be used in the system of FIG. 1.
Figure 2:
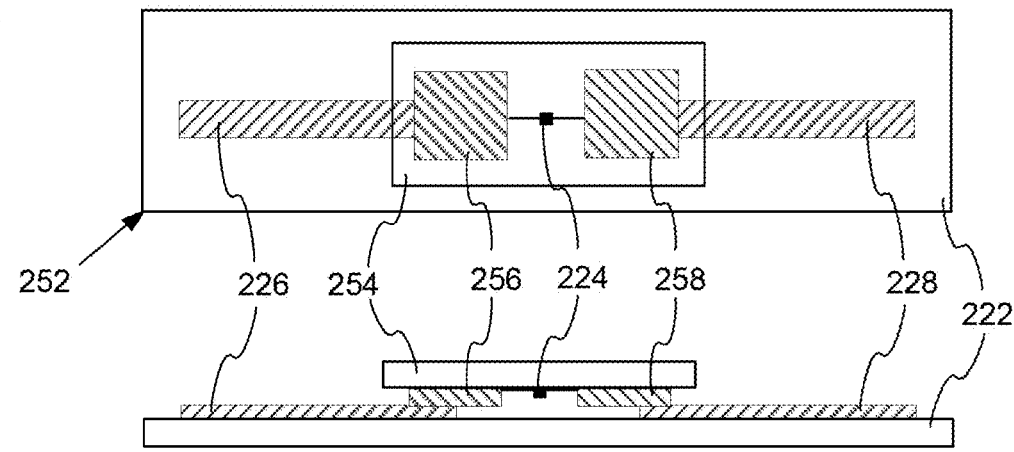
Figure 2:
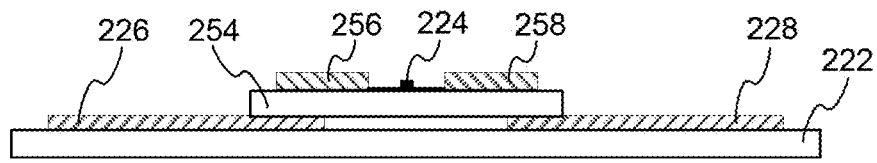

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126.

In the embodiments of FIG. 2, antenna segments 226 and 228 are separate from IC 224. In other embodiments, the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

An RFID tag such as tag 220 is often attached to or associated with an individual item or the item packaging. An RFID tag may be fabricated and then attached to the item or packaging, or may be partly fabricated before attachment to the item or packaging and then completely fabricated upon attachment to the item or packaging. In some embodiments, the manufacturing process of the item or packaging may include the fabrication of an RFID tag. In these embodiments, the resulting RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. An "RFID IC" may refer to an item capable of receiving and responding to RFID signals. For example, an item having a separate but attached RFID tag can be considered an RFID IC, as is an item having an integrated RFID tag or an item manufactured to have the capabilities of an RFID tag. A standalone RFID tag may also be referred to as an "RFID IC".

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, suitable for passive tags, is called half-duplex, and is described below.

Figure 3:
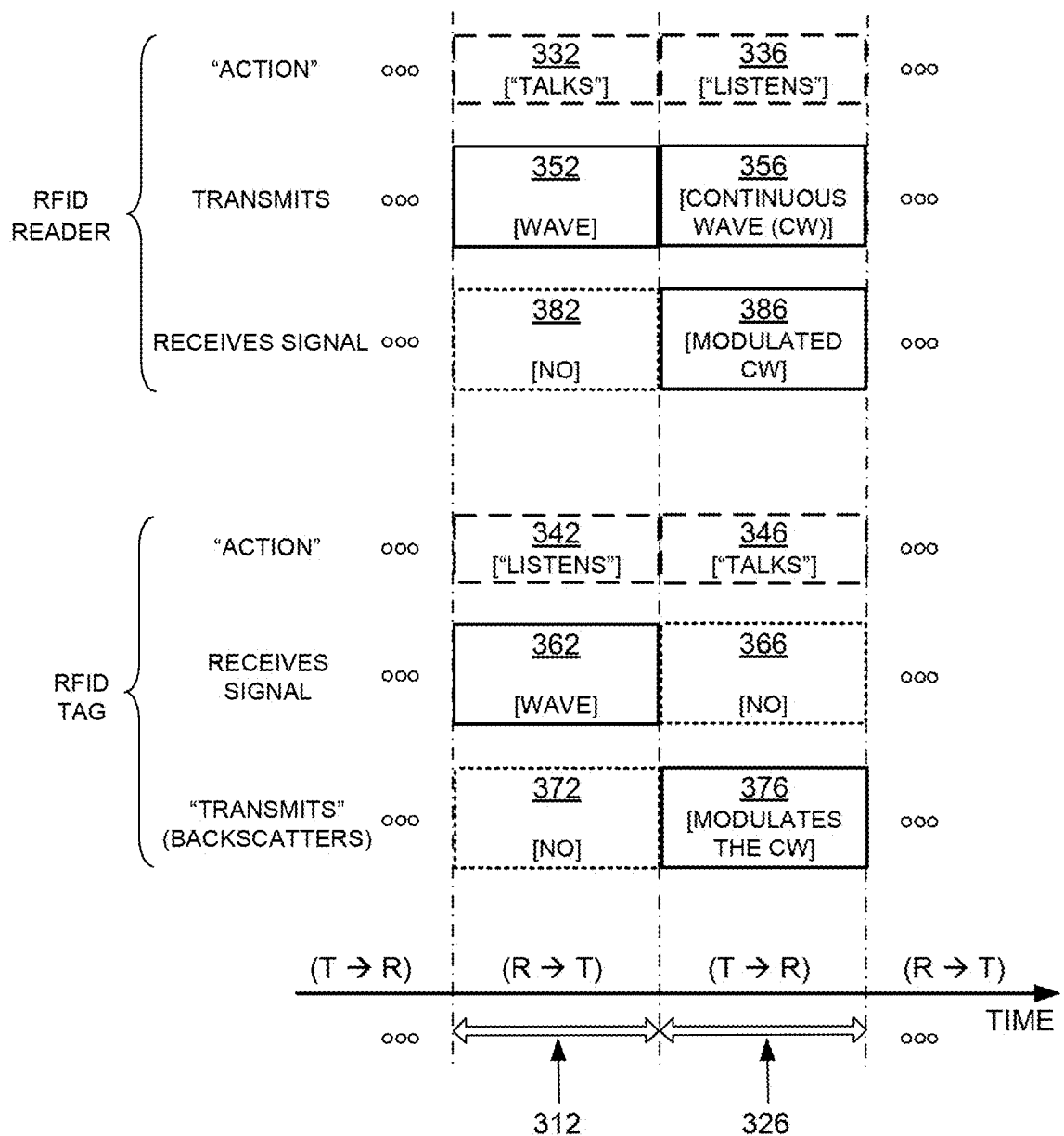
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Interval 312 may typically be of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, which may also be referred to as a backscatter time interval or backscatter interval, tag 120 talks to reader 110 as follows. According to block 356, reader 110 transmits a continuous wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126, for example by adjusting its antenna reflectance. Concurrently, according to block 386, reader 110 receives backscatter signal 126 and processes it.

Figure 4:
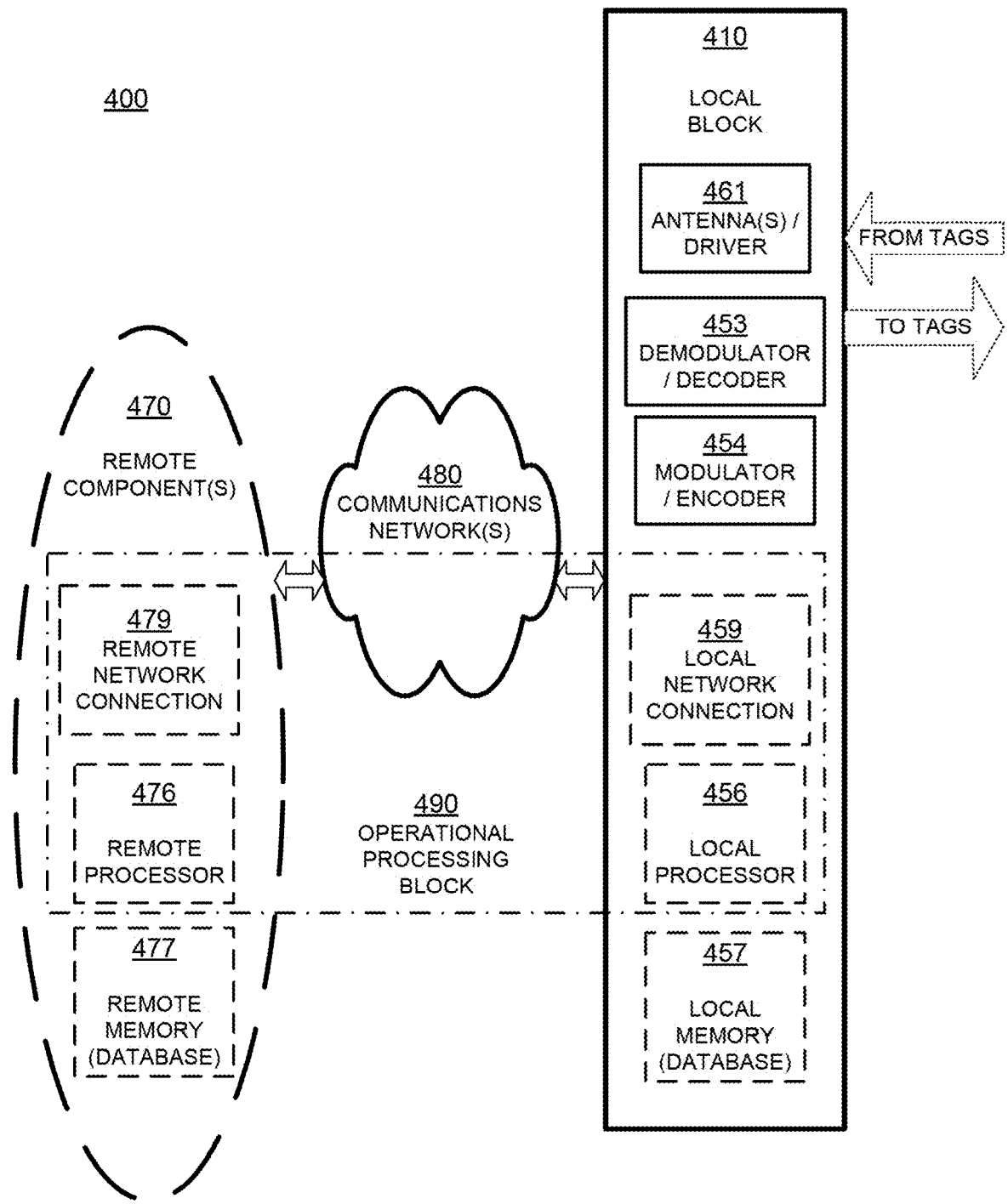
FIG. 4 is a block diagram showing a detail of an RFID reader system, such as the one shown in FIG. 1.

FIG. 4 is a block diagram of an RFID reader system 400 according to embodiments. RFID reader system 400 includes a local block 410, and optionally remote components 470. Local block 410 and remote components 470 can be implemented in any number of ways. For example, local block 410 or portions of local block 410 may be implemented as a standalone device or as a component in another device. In some embodiments, local block 410 or portions of local block 410 may be implemented as a mobile device, such as a handheld RFID reader, or as a component in a mobile device, such as a laptop, tablet, smartphone, wearable device, or any other suitable mobile device. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

In some embodiments, one or more of the blocks or components of reader system 400 may be implemented as integrated circuits. For example, local block 410, one or more of the components of local block 410, and/or one or more of the remote component 470 may be implemented as integrated circuits using CMOS technology, BJT technology, MESFET technology, and/or any other suitable implementation technology.

Local block 410 is responsible for communicating with RFID tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. Some readers contain multiple antennas and drivers that can operate simultaneously. In some embodiments, block 451 may be a phased-array antenna or synthesized-beam antenna (SBA), described in more detail below, and local block 410 may be implemented in a synthesized-beam reader (SBR) configured to generate one or more beams via the SBA. A demodulator/decoder block 453 demodulates and decodes backscattered waves received from the tags via antenna/driver block 451. Modulator/encoder block 454 encodes and modulates an RF wave that is to be transmitted to the tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases, local processor 456 may implement an encryption or authentication function; in some cases, one or more of these functions can be distributed among other blocks such as encoding block 454, or may be entirely incorporated in another block.

Local block 410 additionally includes an optional local memory 457. Local memory 457 may be implemented in any number of ways known in the art, including, by way of example and not of limitation, any of the memory types described above as well as any combination thereof. Local memory 457 can be implemented separately from local processor 456, or in an IC with local processor 456, with or without other components. Local memory 457, if provided, can store programs for local processor 456 to run, if needed.

In some embodiments, local memory 457 stores data read from tags, or data to be written to tags, such as Electronic Product Codes (EPCs), Tag Identifiers (TIDs) and other data. Local memory 457 can also include reference data that is to be compared to EPCs, instructions and/or rules for how to encode commands for the tags, modes for controlling antenna 451, encryption/authentication algorithms, algorithms for tracking tag location or movement, secret keys, key pairs, individual public and/or private keys, electronic signatures, and so on. In some of these embodiments, local memory 457 is provided as a database.

Some components of local block 410 typically treat the data as analog, such as the antenna/driver block 451. Other components such as local memory 457 typically treat the data as digital. At some point, there is a conversion between analog and digital. Based on where this conversion occurs, a reader may be characterized as "analog" or "digital", but most readers contain a mix of analog and digital functionality.

If remote components 470 are provided, they are coupled to local block 410 via an electronic communications network 480. Network 480 can be a Local Area Network (LAN), a Metropolitan Area Network (MAN), a Wide Area Network (WAN), a network of networks such as the internet, or a local communication link, such as a USB, PCI, and so on. Local block 410 may include a local network connection 459 for communicating with communications network 480 or may couple to a separate device or component configured to communicate with communications network 480. Communications on the network can be secure, such as if they are encrypted or physically protected, or insecure if they are not encrypted or otherwise protected.

There can be one or more remote component(s) 470. If more than one, they can be located at the same location, or in different locations. They may communicate with each other and local block 410 via communications network 480, or via other similar networks, and so on. Accordingly, remote component(s) 470 can use respective remote network connections. Only one such remote network connection 479 is shown, which is similar to local network connection 459, etc. In some embodiments, a single one of the remote component(s) 470 may be configured to communicate with and/or control multiple local blocks, each similar to local block 410.

Remote component(s) 470 can also include a remote processor 476. Remote processor 476 can be made in any way known in the art, such as was described with reference to local processor 456. Remote processor 476 may also implement an encryption/authentication function and/or a tag location/tracking function, similar to local processor 456.

Remote component(s) 470 can also include a remote memory 477. Remote memory 477 can be made in any way known in the art, such as was described with reference to local memory 457. Remote memory 477 may include a local database, and a different database of a standards organization, such as one that can reference EPCs. Remote memory 477 may also contain information associated with commands, tag profiles, keys, or the like, similar to local memory 457.

One or more of the above-described elements may be combined and designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable, etc. In addition, operational processing block 490 can receive and decode RF waves received via antenna/driver 451, and cause antenna/driver 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna/driver block 451, with modulator/encoder block 454 encoding and modulating the information on an RF wave. Then data is received from the tags via antenna/driver block 451, demodulated and decoded by demodulator/decoder block 453, and processed by operational processing block 490.

Embodiments of an RFID reader system can be implemented as hardware, software, firmware, or any combination. Such a system may be subdivided into components or modules. Some of these components or modules can be implemented as hardware, some as software, some as firmware, and some as a combination. An example of such a subdivision is now described, together with the RFID tag as an additional module.

Figure 5:
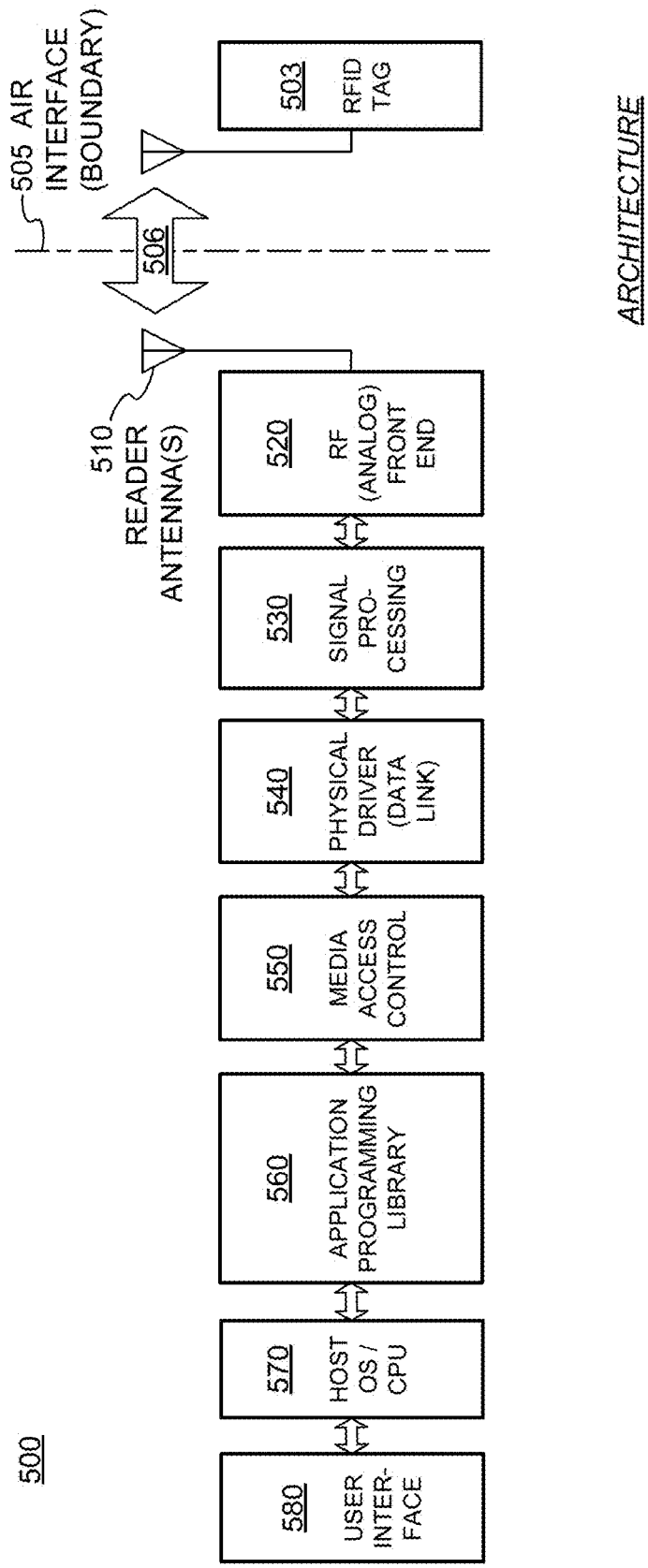
FIG. 5 is a block diagram illustrating an overall architecture of an RFID system according to embodiments.

FIG. 5 is a block diagram illustrating an overall architecture of an RFID system 500 according to embodiments. RFID system 500 may be subdivided into modules or components, each of which may be implemented by itself or in combination with others. In addition, some of them may be present more than once. Other embodiments may be equivalently subdivided into different modules. Some aspects of FIG. 5 are parallel with systems, modules, and components described previously.

An RFID tag 503 is considered here as a module by itself. RFID tag 503 conducts a wireless communication 506 with the remainder, via the air interface 505. Air interface 505 is really a boundary, in that signals or data that pass through it are not intended to be transformed from one thing to another. Specifications as to how readers and tags are to communicate with each other, for example the Gen2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges waveforms with RF front-end module 520, such as I and Q waveform pairs.

RFID system 500 further includes a physical-driver module 540, which is also known as a data-link module. In some embodiments, physical-driver module 540 exchanges bits with signal-processing module 530. Physical-driver module 540 can be the stage associated with the framing of data.

RFID system 500 additionally includes a media access control module 550. In one embodiment, media access control layer module 550 exchanges packets of bits with physical driver module 540. Media access control layer module 550 can make decisions for sharing the medium of wireless communication, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500. In some embodiments, the one or more processors may perform operations associated with retrieving data that may include a tag public key, an electronic signature, a tag identifier, an item identifier, and/or a signing-authority public key. In some embodiments, the one or more processors may verify an electronic signature, create a tag challenge, and/or verify a tag response.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 510 receives wireless waves, which are in turn processed successively by the various modules in the chain. Processing can terminate in any one of the modules. In transmitting mode, waveform initiation can be in any one of the modules. Ultimately, signals are routed to reader antenna(s) 510 to be transmitted as wireless waves.

The architecture of RFID system 500 is presented for purposes of explanation, and not of limitation. Its subdivision into modules need not be followed for creating embodiments. Furthermore, the features of the present disclosure can be performed either within one of the modules, or by a combination of them. In some embodiments RFID system 500 can be incorporated into another electronic device such as a checkout terminal in a store or a consumer device such as a mobile phone.

As described above, synthesized-beam RFID readers (SBRs) may be used for portal monitoring. An SBR can generate multiple radio frequency (RF) beams, and may be formed by coupling one or more RFID readers (or distributed portions of one or more readers) to antenna elements in a synthesized-beam antenna.

Figure 6:
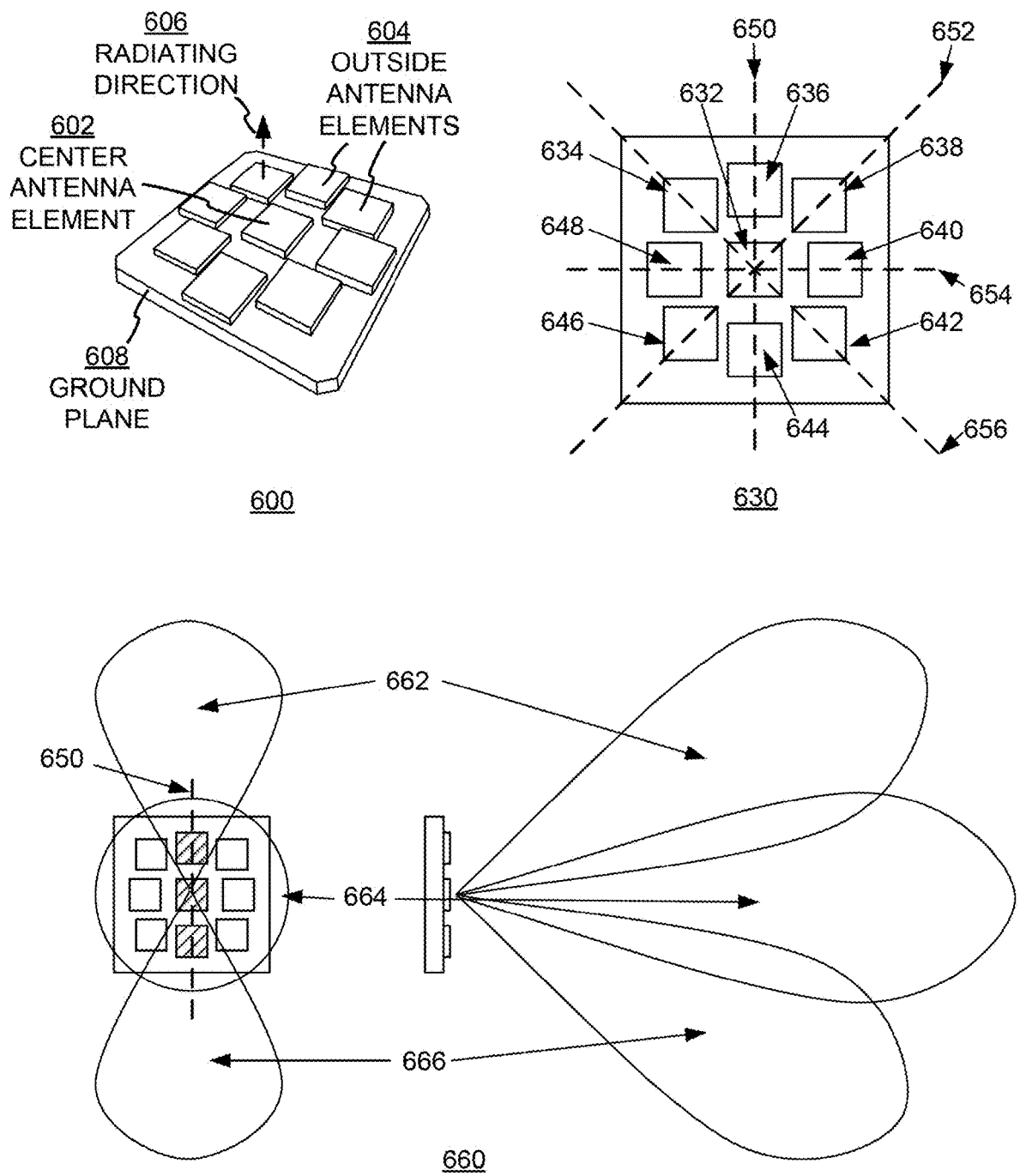
FIG. 6 depicts a synthesized-beam antenna and synthesized beams oriented in different physical directions, according to embodiments.

FIG. 6 depicts a synthesized-beam antenna (SBA) 600 with discrete radiating elements suitable for an SBR according to embodiments. SBA 600 includes an array of antenna elements 602 and 604, and a ground plane 608 behind elements 602 and 604. Each element has a radiating direction vector 606 (only shown for one element) that is typically, but not necessarily, perpendicular to the ground plane. An RF radiation pattern (or "beam") for receiving or transmitting an RF signal may be synthesized by adjusting the amplitude and/or phase of the signals coupled from/to each antenna element 602 and 604. The orientation or direction of the synthesized beam (typically represented by the direction of the beam's primary lobe—the lobe having the highest radiated power) is controlled by these various amplitude and/or phase adjustments. The adjustments may be analog, digital, or a mix of analog and digital. For example, during transmission, an SBR may generate the analog signal to be transmitted, split the signal, and then direct the split signals to elements 602 and 604 with different amplitudes and phases. Alternatively, the SBR may synthesize different signals for each antenna element digitally and then convert the digital signals to analog. In some embodiments, each antenna element can be implemented as a separate digital transceiver having its own analog front end. Control signals to generate a beam can then be supplied to the different digital transceivers, each of which converts a digital signal into an analog signal for transmission. When the digital transceivers transmit their analog signals, the signals combine to form the synthesized beam. In other embodiments, the SBR may use a mix of these approaches. Similarly, during a receive operation the SBR may combine analog signals after appropriate phase shifting and amplitude adjustment of each, or it may digitize the signals from each element and combine them digitally, or a mix thereof. In some embodiments, each element of an SBA may be or coupled to a separate reader. The different readers may then coordinate with each other (for example, via communications over a network) to generate beams. In this situation, the system with the multiple readers, each associated with an antenna element, may be referred-to as an SBR.

The antenna elements of SBA 600 may be one or more of patch, slot, wire, horn, helical, distributed, or any other type as will be known to those skilled in the art. Whereas FIG. 6 only shows nine antenna elements, antenna arrays with any number of antenna elements may be used, including a single distributed element or an element made from metamaterials. In some embodiments ground plane 608 may be nonplanar (e.g., curved, concave, convex, etc.) and in other embodiments need not exist.

Diagrams 630 and 660 show the directions of some of the RF beams that SBA 600 can generate. SBA 600 has nine antenna elements 632-648, with element 632 at the center and elements 634-648 around it. The shape and direction of the beam that SBA 600 generates depends on the signals to/from each element. Suppose that SBR 600 transmits using primarily elements 632, 636, and 644. Then, depending on the amplitude and phase of the signals applied to these elements, SBA 600 can change the orientation of a beam (also referred to as "steering" the beam) along the direction indicated by dashed line 650. In a similar fashion, suppose that SBR 600 transmits primarily using elements 632, 638, and 646. Then, depending on the amplitude and phase of the signals applied to these elements, SBA 600 can steer a beam along the direction indicated by dashed line 652. Of course, other steering arrangements are possible, including using all 9 elements to transmit and/or receive in arbitrary directions and to generate narrow beams.

Diagram 660 shows how RF beams with different directions can be synthesized using antenna elements located along line 650, with the diagram to the left depicting a head-on view similar to diagram 630 and the diagram to the right depicting a side view. As described above, the beam direction can be controlled by varying the amplitude and phase of the signals to/from the antenna elements. For example, by applying a leading signal phase to element 636, an intermediate signal phase to element 632, and a trailing signal phase to element 644, the SBA will tend to steer its beam downward as in beam 666. Switching leading and lagging from elements 636/644 to elements 644/636 will tend to steer the beam upwards as in beam 662. Of course, the actual beam shape depends on both the magnitude of the phase shifting and the magnitude of the amplitude scaling (if any).

A beam can be characterized by one or more longitudinal beam cross-sections (that is, cross-sections of the beam in one or more planes parallel to the beam direction) and/or perpendicular beam cross-sections (that is, cross-sections of the beam in one or more planes perpendicular to the beam direction). A beam can also be characterized by a beam length indicative of the power distribution of the beam along the beam direction, a beam width indicative of the power distribution of the beam in a direction perpendicular to the beam direction, and/or any other suitable shape-based parameter. Beam shapes may be based on, for example, the type of antenna used, the RF frequency of the beam, the power used to generate the beam, and/or how the beam is transmitted. In synthesized-beam embodiments, the beam illumination may be based on the arrangement of excited antenna elements and the amplitude, phase, and/or frequency of the various signals used to excite the antenna elements.

Each beam generated by an SBR or any antenna element or combination of antenna elements has a coverage volume, also known as the beam's "field-of-view", which is a volume in three-dimensional space where, during transmission, the transmitted energy density exceeds a threshold, and where, during receiving, the received energy density exceeds a threshold. Different beams may have different fields-of-view and may also overlap with each other to some degree. A beam's coverage area is a projection of the beam's field-of-view on a surface, may be of any suitable shape, and may vary based on interactions between the different elements that generate the beam, as well as the orientation and topology of the surface on which the coverage area is projected. The field-of-view and coverage area may be different during transmit and receive, and may vary with reader or tag power, the thresholds, the distance between the SBR and the surface, and other parameters. For example, a beam may have different fields-of-view and therefore coverage areas based on the threshold(s) selected for transmitted and/or received energy densities.

An SBR may be configured to switch between different individual beams based on a desired beam scanning timing or pattern. For example, an SBR may generate a first beam at a first time for a first time-duration, then may switch to generating a second, different beam at a second time for a second time-duration, and so on. The order, timing, and time-durations with which an SBR switches between generating different beams may be predefined or dynamic. In one embodiment, an SBR may switch between different beams based on a predefined schedule and scan pattern. In another embodiment, an SBR may dynamically determine the beams to generate, the times when they should be generated, and the time durations for which they should be generated based on environmental or other conditions (e.g., the actual or estimated number of tags present, actual or predicted tag movement patterns, RF interference, environmental noise, or any other suitable condition or parameter). In other embodiments, an SBR may generate beams by dynamically adjusting a predefined schedule and scan pattern based on environmental conditions. An SBR may be configured to switch beams to optimize the number of tags inventoried, optimize the ability to detect fast-moving tags, or be configured to provide any desired performance metric.

RFID systems can be used to track the passage of items through chokepoints, such as hallways or portals. For example, an RFID reader positioned to inventory tagged items passing through a loading dock portal can track the transition of tagged pallets or items through the portal. However, in situations where multiple chokepoints are present, an RFID reader tracking items passing through one chokepoint may mistakenly detect items passing through other chokepoints. For example, an RFID reader configured to track items passing through a first loading dock portal may inadvertently inventory items passing through a second, adjacent loading dock portal and mistakenly determine that those items passed through the first loading dock portal.

In some embodiments, RFID reader systems capable of generating different beams, such as reader systems with SBRs or with multiple readers or antennas, can (a) reduce the inadvertent inventorying of items passing through other portals and/or (b) be configured to track items passing through multiple, adjacent portals.

Figure 7:
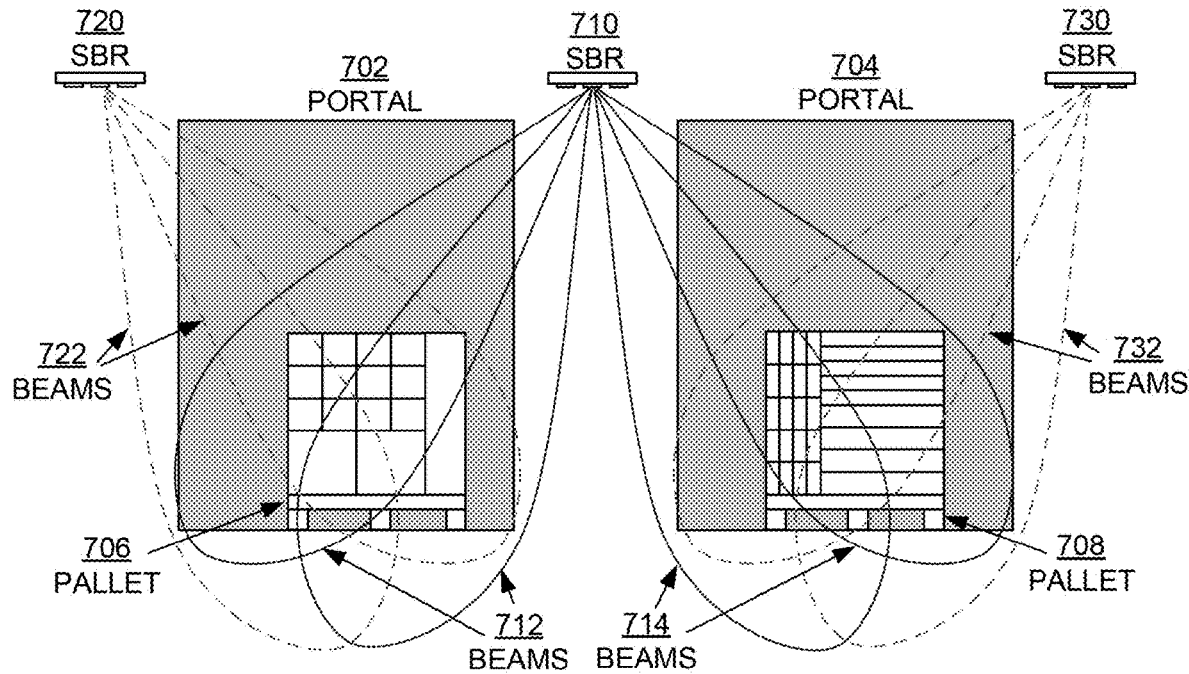
FIG. 7 depicts how synthesized-beam readers can be used to detect and inventory items passing through portals, according to embodiments.
Figure 7:
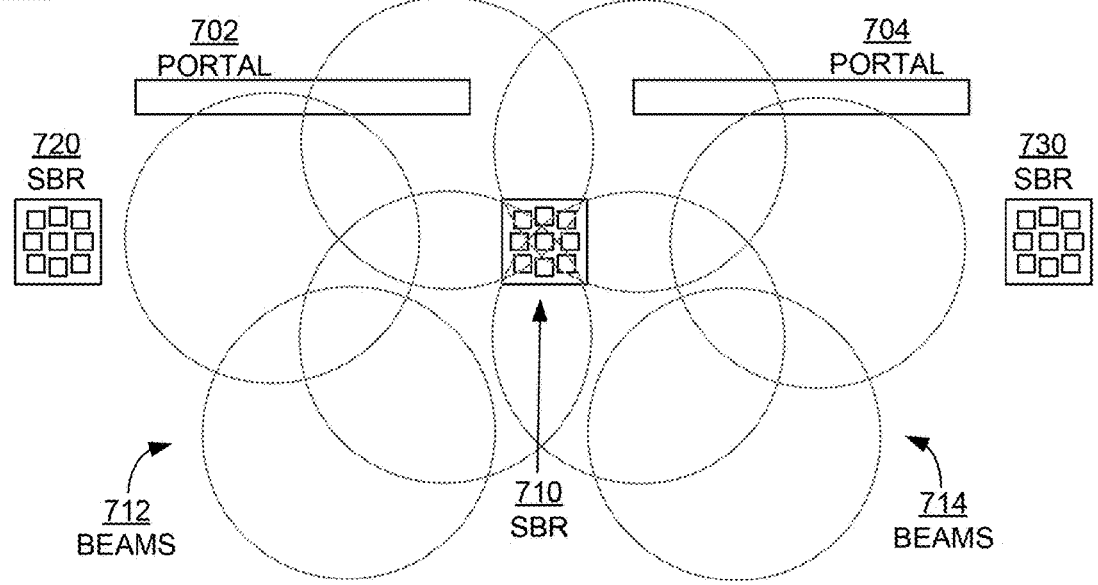

FIG. 7 depicts how synthesized-beam readers can be used to detect and inventory items passing through portals, according to embodiments. Diagrams 700 and 750 are front and top views, respectively, of adjacent portals 702 and 704. The portals 702 and 704 are configured to allow pallets, such as pallets 706 and 708, to pass through. SBRs 710, 720, and 730 are mounted in "overhead offset" positions in which each reader "looks down" on the space in front of the portals 702/704 such that only a subset of beams from each SBR have fields-of-view that overlap the space in front of each portal. For example, SBR 710 is configured to generate beams 712 and 714 that are oriented toward and overlap the space in front of portal 702 and portal 704, respectively. SBR 720 is configured to generate beams 722 that are oriented toward and overlap the space in front of portal 702 (depicted in diagram 700 but not in diagram 750), and SBR 730 is configured to generate beams 732 that are oriented toward and overlap the space in front of portal 704 (also depicted in diagram 700 but not in diagram 750). Beams 712 and 722 can be used to determine the location and movement (e.g., trajectories, trajectory directions, and/or trajectory speeds) of items passing into and out of portal 702, while beams 714 and 732 can be used to determine the location and movement of items passing into and out of portal 704.

The SBRs 710, 720, and 730 may each independently determine their own beam scanning/switching patterns (as described above) or may be part of a reader system with a centralized or distributed controller that determines the beam scanning/switching pattern for the SBRs. In the latter case, the controller functionality may be distributed among processors at two or more different SBRs, implemented at a single processor associated with a specific SBR, or implemented at a processor coupled to the SBRs.

When an SBR such as SBRs 710, 720, or 730 transmits inventorying commands and receives replies from a tagged item responding to the inventorying commands, a tracking application coupled to the SBR may use the replies to estimate a location of the detected item. The tracking application may be implemented in hardware and/or software, and may be implemented at a particular SBR, at a separate processor coupled to the SBRs, or distributed across different SBRs and/or processors.

When SBR 710 receives replies from a tagged item responding to previously transmitted inventorying commands, the coupled tracking application can identify the beam on which the item was detected and then determine whether the item is more likely to be associated with portal 702 or portal 704. For example, the tracking application can determine whether replies from an item were received on a beam in beams 712 or beams 714. If the replies were received via a beam in beams 712, then the tracking application may determine that the item is associated with portal 702. On the other hand, if the replies were received via a beam in beams 714, then the tracking application may determine that the item is associated with portal 704. Similarly, the tracking application may be able to associate a detected item with a particular portal based on the beams from SBRs 720 and 730 on which the item is detected. For example, the tracking application may associate an item whose replies were received on beams 722 from SBR 720 with portal 702, and the tracking application may associate an item whose replies were received on beams 732 from SBR 730 with portal 704. Accordingly, the tracking application can use beams from SBRs 710, 720, and 730 to differentiate between items passing through portal 702 and items passing through portal 704.

In some embodiments, the tracking application may estimate the location of a detected item using cumulative reply parameters associated with replies received from the item. A reply parameter associated with an item may be an individual reply from the tag to a reader command or a parameter associated with the reply, such as received signal strength indication (RSSI), reply power, reply angle-of-arrival, reply phase, reply contents, or similar. A cumulative reply parameter associated with the item is the combination of reply parameters over multiple replies from the item. Cumulative reply parameters may be reply counts, cumulative reply RSSIs, cumulative reply power, average angle-of-arrival, average phase, or similar.

The reply count of an item on a beam refers to the number of times a reply is received from the item on that beam over a time duration or window. Reply count may also be equivalently expressed as an item reply rate, which is the reply count divided by the relevant time window. In some embodiments, individual item reply counts or rates may be adjusted or scaled differently based on the situation.

The RSSI of a reply from an item is an indication of the strength of the reply signal, and the tracking application may determine an RSSI for each reply from the item received on a certain beam and combine the RSSIs for all the replies from the item received on the beam to generate a cumulative reply RSSI for the item on that beam. The power of a reply from an item is related to the RSSI for that reply and can be calculated by appropriate conversion of the reply RSSI. For example, the tracking application may determine an RSSI for each reply from the item received on a certain beam, convert the RSSI to a reply power, and combine the reply powers to form a cumulative reply power. Alternatively, the tracking application may generate a cumulative reply RSSI as described above and then convert the cumulative reply RSSI to a cumulative reply power. The tracking application may combine the RSSIs and powers using any suitable technique (e.g., addition, multiplication, or similar), and may scale individual RSSIs or powers differently based on the situation.

The angle-of-arrival of a reply is a measure of the angle between a receiver of the reply and the originator of the reply. The angle-of-arrival of a reply can be computed based on the timing difference between when the reply is received at a first receiver and when the reply is received at a second receiver. For example, if the first receiver receives the reply before the second receiver does, then the originator of the reply is closer to the first receiver, assuming that the reply propagates at a similar speed to both receivers. The angle-of-arrival of the reply can then be estimated based on the timing difference and the spatial separation of the receivers. The signal phase of a backscattered reply may be used to determine a phase difference between the backscattered reply and the transmitted signal used for the backscatter. The phase difference may provide information about the distance between a receiver and the reply originator. In some embodiments, phase differences at two different receivers may be used to determine an angle-of-arrival, as described above.

In one embodiment, the tracking application may estimate item location based on the highest cumulative reply parameter. For example, the tracking application may identify the beam having the highest reply count, reply rate, cumulative reply RSSI, and/or cumulative reply power, and estimate that the item is at the location or portal associated with the identified beam.

In some embodiments, the tracking application may estimate item location based on a combination of cumulative reply parameter values. For example, the tracking application may combine the cumulative reply parameter values for multiple beams associated with a single location (e.g., the beams in beams 712, associated with portal 702) to estimate whether an item is at the location. As another example, the tracking application may form a ratio of two cumulative reply parameter values, each corresponding to a different beam or location, to determine the likelihood that an item is at each location. In this example, the larger the ratio of the two cumulative reply parameter values, the more likely that the item is in the beam or at the location represented by the cumulative reply parameter value in the numerator of the ratio. Similarly, the smaller the ratio, the more likely that the item is in the beam or at the location represented by the cumulative reply parameter value in the denominator of the ratio.

In some embodiments, the tracking application may use reply angles-of-arrival and/or signal phases to estimate the item location. For example, the tracking application may use angles-of-arrival and/or signal phases from multiple replies from an item to triangulate or trilaterate the item. The tracking application may also combine two or more of the above parameters to refine the item location estimation. For example, after identifying a beam based on highest cumulative reply parameter, the tracking application may use angle-of-arrival or phase to determine whether the replies mostly originate from the beam's main lobe (pointed in the beam's nominal direction), from a side lobe (pointed away from the beam's nominal direction) of the beam, or from reflections from the environment or another beam entirely. If the angle-of-arrival/phase indicates that the replies originate from side lobes or are caused by reflection, then the tracking application may determine that the item is not at the location associated with the beam.

RFID systems can also be configured to determine whether a detected item is moving, and if so, its trajectory, trajectory direction, and trajectory speed. The item's trajectory represents the physical locations, route, course, or path of the item over time. The item's trajectory direction indicates the direction of item movement along the item trajectory, and the item's trajectory speed indicates how fast the item is moving in the trajectory direction along the item trajectory.

Figure 8:
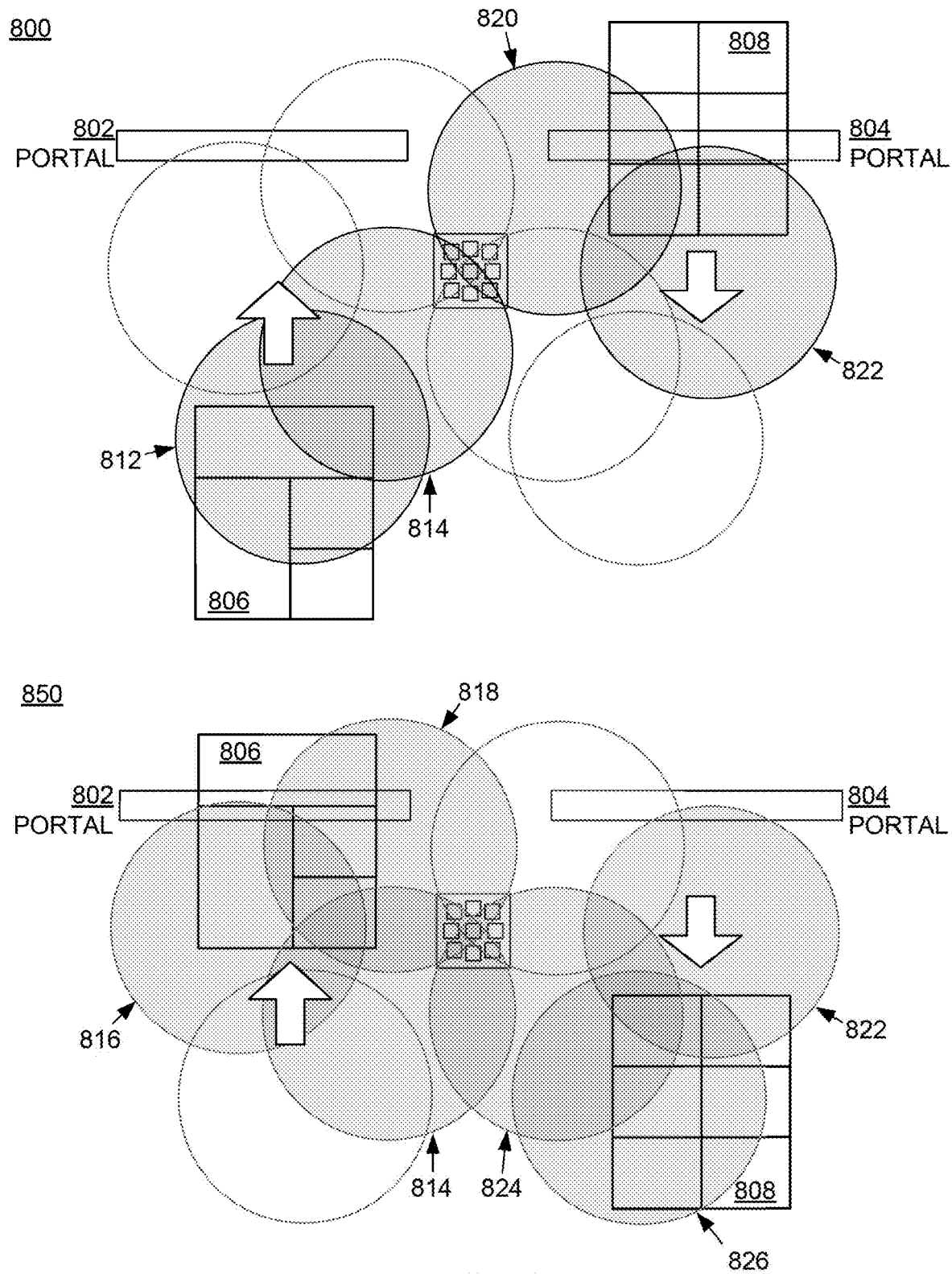
FIG. 8 depicts how synthesized-beam readers can be used to detect the motion of items passing through portals, according to embodiments.

FIG. 8 depicts how synthesized-beam readers can be used to detect the motion of items passing through portals, according to embodiments. FIG. 8 depicts top-down views of adjacent portals 802 and 804 and pallets 806 and 808 at a time 800 and at a subsequent time 850. Beams 812-826, generated by an RFID system having at least one SBR (e.g., similar to SBR 710), are configured to monitor RFID-tagged items passing into and out of portals 802 and 804. Pallets 806 and 808 are tagged or hold tagged items, and can therefore be read or inventoried by beams 812-826 if within range.

At time 800, pallet 806 is moving toward portal 802, and a tracking application operative in the RFID system receives replies from pallet 806 on beams 812 and 814, but not on any other beams. Beams 812 and 814 are near but not at portal 802. Accordingly, the tracking application can use the location estimation described above to determine that at time 800 pallet 806 is near but not at portal 802. Also at time 800, pallet 808 is moving through portal 804, and the tracking application receives replies from pallet 808 on beams 820 and 822, but not on any other beams. Beams 820 and 822 at least partially overlap portal 804. Accordingly, the tracking application can use the location estimation described above to determine that at time 800 pallet 808 is at portal 804.

Subsequently, pallet 806 continues moving to portal 802 and pallet 808 continues moving through and away from portal 804. At time 850, the tracking application continues to receive replies from pallet 806 on beam 814, but no longer on beam 812. In addition, the tracking application now receives replies from pallet 806 on beams 816 and 818, at least partially overlapping portal 802. Accordingly, the tracking application can use the location estimation described above to determine that at time 850 pallet 806 is at portal 802. Furthermore, because the tracking application knows the location of pallet 806 at times 800 and 850, the tracking application can further determine pallet 806's speed and direction of travel (e.g., away from beam 812 and toward beam 818, or toward portal 802).

Similarly, at time 850 the tracking application continues to receive replies from pallet 808 on beam 822, but no longer on beam 820. In addition, the tracking application now receives replies from pallet 808 on beams 824 and 826, near but not at portal 804. Accordingly, the system tracking application can determine that (a) at time 850 pallet 808 is no longer at portal 804, (b) the direction of travel of pallet 808 (e.g., away from beam 820 and toward beam 826, or away from portal 804), and (c) the travel speed of pallet 808.

In some embodiments, RF interferers and reflectors in the environment can reflect or otherwise propagate RF energy from a beam to a location outside the beam field-of-view, thereby creating spurious replies from items outside the beam field-of-view and causing errors in the item location and trajectory estimation process. The tracking application may alleviate the effect of such spurious replies by, for example, removing spurious replies, averaging or accumulating replies over time, and/or using a ratio of cumulative reply parameter values, as described above.

In some embodiments, the tracking application removes spurious replies. Spurious replies may have reply parameter values that differ significantly from non-spurious replies. For example, a spurious reply may have significantly lower signal power, significantly different RSSI, different angle-of-arrival, or otherwise appear as an outlier with respect to other received replies. The tracking application may remove spurious replies explicitly, for example by determining that a reply is spurious and discarding it. In some embodiments, the significant differences of spurious replies as compared to non-spurious replies make spurious replies appear as high-frequency features as a function of time, and the tracking application may filter spurious replies out, for example by using a low-pass filter to remove high-frequency features corresponding to spurious replies.

The tracking application may average or accumulate replies over time, such that spurious replies are outnumbered by non-spurious replies. In this situation, the reply parameter values of the non-spurious replies dominate, thereby reducing the error due to spurious replies in the location estimation process.

The tracking application may use a ratio of cumulative reply parameter values to alleviate the effect of spurious replies. For example, suppose that the tracking application receives replies from pallet 806 on beam 812 and beam 816. The tracking application may compute cumulative reply parameters for pallet 806 for both beams and generate a ratio of the cumulative reply parameters. Suppose that the ratio has the cumulative reply parameter for beam 812 as its numerator and the cumulative reply parameter for beam 816 as its denominator. If the ratio is relatively close to one, then the tracking application may not be able to determine whether pallet 806 is more closely associated with beam 812 or beam 816, although in some embodiments, the tracking application may assume that pallet 806 is equally associated with both beams (in other words, located between both beams). If the ratio is significantly less than one, then the tracking application may determine that pallet 806 is at the location associated with beam 816, with a confidence based on how close the ratio is to zero (or how far the ratio is from one). Similarly, if the ratio is significantly greater than one, then the tracking application may determine that pallet 806 is at the location associated with beam 812, with a confidence based on how much larger the ratio is than one. In some embodiments, the ratio may be converted to any other suitable scale as desired. For example, the ratio may be converted to a scale such that an unconverted ratio value of "one" is converted to a value of "zero". In this situation, using the ratio described above as an example, if the converted ratio is significantly greater than zero the tracking application may determine that pallet 806 is at the location associated with beam 812, whereas if the converted ratio is significantly less than zero the tracking application may determine that pallet 806 is at the location associated with beam 816.

The tracking application may also use cumulative reply parameter ratios to determine when and in what direction an item such as pallet 806 has transitioned through a chokepoint such as portal 802. For example, suppose the cumulative reply parameter ratio is as described above, with the numerator representing beam 812 and the denominator representing beam 816. If pallet 806 is moving through portal 802 in the direction depicted in FIG. 8, then the cumulative reply parameter ratio will have a first, large value and will fall to a second value significantly less than zero during the movement. If pallet 806 were moving in the opposite direction, then the ratio would have a first value significantly less than zero and rise to a second, large value. Accordingly, the tracking application can determine an item's passage direction through a chokepoint based on the direction or sign of the change in or difference between a first ratio and a second, subsequent ratio.

The tracking application may estimate whether an item has transitioned through any chokepoints before attempting to identify the specific chokepoint through which the item has transitioned. For example, the tracking application may determine, for a detected item, a first cumulative reply parameter ratio where the numerator represents all beams near but not at chokepoints (e.g., beams 812, 814, 824, and 826) and the denominator represents all beams at chokepoints (e.g., beams 816, 818, 820, and 822). The tracking application then uses the first cumulative reply parameter ratio to determine whether the item has transitioned any chokepoint (e.g., either portal 802 or portal 804) and the direction of the transition. Subsequently, or in parallel, the tracking application may then attempt to identify the specific chokepoint through which the item has transitioned.

The tracking application may deem that a transition through a chokepoint is valid (i.e., has probably occurred) if either a difference between the first and second cumulative reply parameter ratio values or the second ratio value satisfy certain thresholds, which may be different depending on the transition direction. For example, the tracking application may use a first ratio or ratio difference value threshold to determine if pallet 806 is moving through portal 802 as depicted in FIG. 8. On the other hand, the tracking application may use a second ratio or ratio difference value threshold if pallet 806 were moving the opposite way. In some embodiments, the tracking application may also require that a valid transition satisfy the threshold for some minimum time, to alleviate ephemeral effects such as those from spurious replies. The threshold may be an unsigned magnitude, which can be satisfied regardless of the direction of the change or the sign of the ratio, or may be a signed magnitude, which can only be satisfied by a change in the corresponding direction or a ratio with the appropriate sign.

The valid transition of an item through a chokepoint may be used to determine whether other item transitions through chokepoints are valid. For example, suppose a tracking application identifies a valid transition of a first item through a first chokepoint in a first direction. If the first item is associated with other items (e.g., other items within the same pallet as the first item), then the tracking application may determine that it is relatively more likely that the other items will also transition through the first chokepoint in the first direction at that time. Accordingly, the tracking application may reduce the thresholds used to validate transitions through the first chokepoint in the first direction around the time of the first item's transition, to account for the increased probability of transition and to capture as many potentially transiting items as possible. Subsequently, the tracking application may increase the thresholds to their former levels or even higher to reduce the likelihood of false alarms. In some embodiments, the tracking application may validate transitions for items identified as associated with the first item (e.g., items known to be previously on the same pallet as the first item) using the reduced thresholds, but validate transitions for other items not identified as associated with the first item (e.g., items not previously on the same pallet as the first item or on entirely different pallets) using unreduced thresholds.

FIG. 8 depicts beams from a single SBR/SBA, but in other embodiments beams from other SBRs or SBAs can be used to locate and track tagged items. For example, beams from SBRs or SBAs mounted on the far sides of portals 802 and 804 (similar to the SBRs depicted in FIG. 7) can be used, in conjunction with beams 812-826, to locate and track pallets 806 and 808.

In some embodiments, beams from readers or antennas not explicitly associated with a chokepoint may also be used in the item location and trajectory estimation techniques described above. For example, a facility may include readers that generate beams configured to track item location or movement within the facility. Suppose replies from an item are received on such beams. A tracking application may then determine that the item is within the facility. Suppose then a potential chokepoint transition of the item is detected. If the detected transition is into the facility, and a previous transition of the item out of the facility was not detected, the tracking application may ignore that transition or flag that transition as erroneous, because the item was already determined to be within the facility. If the detected transition is out of the facility and replies from the item are subsequently received on beam(s) outside the facility, then the tracking application has additional confidence that the detected transition is correct. On the other hand, if the detected transition is out of the facility and replies from the item are subsequently received on beam(s) within the facility, then the tracking application may ignore that transition or flag that transition as erroneous, because the item is still within the facility.

While monitoring is described above in the context of overhead-offset-mounted SBRs, in other embodiments SBRs or SBAs can be mounted in other ways. For example, an overhead SBR or SBA can be mounted directly above a chokepoint such that its beams only cover the chokepoint, or can cover multiple chokepoints. As another example, an SBR or SBA can be mounted between two adjacent chokepoints and oriented horizontally and away from the two chokepoints, such that some beams cover the approach to one chokepoint and other beams cover the approach to the other chokepoint. Similarly, an SBR or SBA can be oriented horizontally between two adjacent chokepoints and toward the chokepoints such that some beams are directed toward and into one chokepoint and other beams are directed toward and into the other chokepoint. In some situations, an SBR or SBA can be mounted such that its beams cover more than two chokepoints.

In some embodiments, item location and trajectory estimation may involve the use of cooperative powering, as described in copending and commonly-owned U.S. patent application Ser. No. 16/023,719, filed on Jun. 29, 2018 and hereby incorporated by reference in its entirety. In these embodiments, multiple beams from multiple readers, such as beams 712 and beams 722 from SBRs 710 and 720, may cooperate as described in the above-referenced application to increase inventorying range and available power.

In other embodiments, non-synthesized-beam reader systems capable of generating multiple beams can be used to implement item location and trajectory estimation. For example, a reader coupled to multiple antennas can generate multiple beams, and the antennas can be mounted to provide patterns of beams suitable for implementing item location and trajectory estimation. Similarly, a reader system with multiple, single-beam readers can generate multiple beams, and the readers can be mounted to provide patterns of beams suitable for implementing item location and trajectory estimation. In general, reader systems capable of generating spatially separated beams, which are beams with fields-of-view that do not entirely overlap, can be used to implement the item location and trajectory estimation techniques described herein. In some embodiments, reader systems capable of generating beams with different fields-of-view, some of which are entirely encompassed by other beams, can also be used to implement the item location and trajectory estimation techniques described herein.

As mentioned previously, embodiments are directed to using RFID systems to estimate item location and trajectory through portals or other chokepoints. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any purpose, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID) system configured to identify a chokepoint through which an RFID tag is transitioning, the system comprising:
 a controller communicatively coupled to one or more readers and configured to control an operation of the one or more readers;
 a first reader configured to:
  generate, based on instructions received from the controller, a first plurality of spatially separated reader beams oriented toward a first chokepoint and a second plurality of spatially separated reader beams oriented toward a second chokepoint different from the first chokepoint;
  transmit inventorying commands on the first and second plurality of reader beams;
  receive, from the RFID tag, a plurality of replies responding to at least some of the inventorying commands; and
  transmit the plurality of replies to the controller, wherein
 the controller is further configured to:
  determine, from the plurality of replies, at least one cumulative reply parameter;
  select, based on the at least one cumulative reply parameter, one of the first and second chokepoints as the chokepoint through which the RFID tag is transitioning; and determine, from the at least one cumulative reply parameter, a transition direction for the RFID tag through the selected chokepoint.

2. The system of claim 1, wherein the at least one cumulative reply parameter is based on a reply count or a cumulative reply power.

3. The system of claim 2, wherein the controller is further configured to derive the cumulative reply power from a plurality of received signal strength indications associated with the plurality of replies.

4. The system of claim 1, wherein the controller is further configured to:
  determine, for at least two reader beams oriented toward the selected chokepoint, respective beam cumulative reply parameters;
  compute, based on the beam cumulative reply parameters, first and second cumulative reply parameter ratios; and
  determine the transition direction by:
    identifying a difference between the first and second cumulative reply parameter ratios; and
    determining the transition direction based on the difference.

5. The system of claim 1, wherein the first plurality of spatially separated reader beams are oriented toward the first chokepoint and the second plurality of spatially separated reader beams are oriented toward the second chokepoint simultaneously.

6. The system of claim 1, further comprising a second reader configured to generate a third plurality of reader beams oriented toward the first chokepoint;
  wherein the inventorying commands are transmitted on the first, second, and third plurality of reader beams.

7. The system of claim 6, wherein the controller is integrated with at least one of the first reader and the second reader.

8. A Radio Frequency Identification (RFID) system employing synthesized-beam readers (SBRs) to track a passage of tags through two neighboring chokepoints, the system comprising:
  a controller; and
  a first SBR communicatively coupled to the controller, wherein the first SBR comprises:
    a synthesized beam antenna (SBA);
    a transceiver coupled to the SBA; and
    a processor coupled to the transceiver, the processor configured to:
      synthesize a first plurality of spatially separated beams oriented toward a first chokepoint;
      synthesize a second plurality of spatially separated beams oriented toward a second chokepoint;
      transmit inventorying commands on the first and second plurality of beams;
      receive, from a first RFID tag and a second RFID tag, a plurality of replies responding to at least some of the inventorying commands; and
      provide the received plurality of replies to the controller, wherein the controller is further configured to:
  determine, from the plurality of replies, at least a first cumulative reply parameter for the first RFID tag and a second cumulative reply parameter for the second RFID tag;
  determine, based on at least the first and the second cumulative reply parameters, that the first and second RFID tags are simultaneously passing through the first and second chokepoints, respectively; and
  determine, based on at least the first and the second cumulative reply parameters, that the first RFID tag is passing through the first chokepoint in a first direction and the second RFID tag is passing through the second chokepoint in a second direction.

9. The system of claim 8, wherein the first cumulative reply parameter is based on a reply count of the first RFID tag.

10. The system of claim 8, wherein the first cumulative reply parameter is based on a cumulative reply power of the first RFID tag.

11. The system of claim 10, wherein the controller is further configured to derive the first cumulative reply power from a plurality of received signal strength indications associated with the plurality of replies.

12. The system of claim 8, wherein the controller is further configured to:
  determine, for at least two beams oriented toward the first chokepoint, respective beam cumulative reply parameters;
  compute, based on the beam cumulative reply parameters, first and second cumulative reply parameter ratios; and
  determine that the first RFID tag is passing through the first chokepoint in the first direction by:
    identifying a difference between the first and second cumulative reply parameter ratios; and
    determining the first direction based on the difference.

13. The system of claim 8, further comprising:
  another reader comprising:
    another transceiver; and
    another processor coupled to the other transceiver, the other processor configured to generate a third plurality of beams oriented toward the first chokepoint; and wherein the inventorying commands are transmitted on the first, second, and third plurality of beams.

14. A Radio Frequency Identification (RFID) system to track the passage of an RFID tag through one of two neighboring portals, the system comprising:
  a first RFID reader;
  a second RFID reader;
  a third RFID reader; and
  a controller communicatively coupled to the first, second, and third RFID readers, wherein the controller is configured to:
    cause both the first RFID reader and the second RFID reader to generate a first plurality of spatially separated beams oriented toward a first one of the portals;
    cause both the second RFID reader and the third RFID reader to generate a second plurality of spatially separated beams oriented toward a second one of the portals;
    cause inventorying commands to be transmitted on the first and second plurality of beams;
    receive, from the RFID tag, a plurality of replies responding to at least some of the inventorying commands;
    determine, from the plurality of replies, at least one cumulative reply parameter;
    select, based on the at least one cumulative reply parameter, one of the first and second portals as the portal through which the RFID tag is passing; and
    determine, based on the at least one cumulative reply parameter, a passage direction for the RFID tag through the selected portal.

15. The system of claim 14, wherein the at least one cumulative reply parameter is based on a reply count or a cumulative reply power.

16. The system of claim 15, wherein the controller is further configured to derive the cumulative reply power from a plurality of received signal strength indications associated with the plurality of replies.

17. The system of claim 14, wherein the controller is a distributed controller and is integrated with one or more of the first, second, and third RFID readers.

18. The system of claim 14, wherein the controller is further configured to:
- determine, for at least two beams in one of the first and second plurality of beams, respective beam cumulative reply parameters;
- compute, based on the beam cumulative reply parameters, first and second cumulative reply parameter ratios; and
- determine the passage direction based on a difference between the first and second cumulative reply parameter ratios.

19. The system of claim 14, wherein:
- the first RFID reader is disposed on a side of the first portal opposite the second RFID reader and the second RFID reader is disposed between the first and second portals; and
- the third RFID reader is disposed on a side of the second portal opposite the second RFID reader.

20. The system of claim 14, wherein at least one of the first, second, and third RFID readers is a synthesized-beam reader (SBR).

* * * * *